(12) United States Patent
Yang et al.

(10) Patent No.: US 10,615,416 B2
(45) Date of Patent: Apr. 7, 2020

(54) BATTERY NEGATIVE ELECTRODE MATERIAL

(71) Applicant: Chung Yuan Christian University, Chung Li (TW)

(72) Inventors: Chun-Chuen Yang, Chung Li (TW); Wei-Jen Liu, Chung Li (TW); Yung-Hsiang Tung, Chung Li (TW); Irish Valerie Buiser Maggay, Chung Li (TW); Cheng-Wei Kao, Chung Li (TW); Tung-Chi Tsai, Chung Li (TW)

(73) Assignee: Chung-Yuan Christian University, Chung Li (TW)

( * ) Notice: Subject to any disclaimer, the term of this patent is extended or adjusted under 35 U.S.C. 154(b) by 0 days.

(21) Appl. No.: 15/813,429

(22) Filed: Nov. 15, 2017

(65) Prior Publication Data

US 2019/0051901 A1 Feb. 14, 2019

(30) Foreign Application Priority Data

Aug. 8, 2017 (TW) .............................. 106126751 A

(51) Int. Cl.

| | |
|---|---|
| *H01M 4/587* | (2010.01) |
| *H01M 4/36* | (2006.01) |
| *H01M 4/134* | (2010.01) |
| *H01M 4/58* | (2010.01) |
| *C01G 45/00* | (2006.01) |

(Continued)

(52) U.S. Cl.
CPC .......... *H01M 4/587* (2013.01); *C01B 19/002* (2013.01); *C01B 32/05* (2017.08); *C01G 45/00* (2013.01); *H01M 4/133* (2013.01); *H01M 4/134* (2013.01); *H01M 4/362* (2013.01); *H01M 4/581* (2013.01); *H01M 4/5815* (2013.01); *H01M 10/3909* (2013.01); *C01P 2006/40* (2013.01); *H01M 10/054* (2013.01); *H01M 10/0525* (2013.01); *H01M 2004/027* (2013.01)

(58) Field of Classification Search
CPC .... H01M 4/581; H01M 4/5815; H01M 4/133; H01M 4/134; H01M 4/362; H01M 4/587; H01M 10/0525; H01M 10/054; H01M 10/3909; H01M 2004/027; C01G 39/006; C01G 45/00; C01P 2006/40; C01B 32/05; C01B 19/002
See application file for complete search history.

(56) References Cited

U.S. PATENT DOCUMENTS

| | | | | |
|---|---|---|---|---|
| 6,300,009 B1 * | 10/2001 | Yoshida | ............... | C01G 39/006 |
| | | | | 429/218.1 |
| 6,319,633 B1 * | 11/2001 | Ikeda | .................... | H01M 4/136 |
| | | | | 429/218.1 |

* cited by examiner

*Primary Examiner* — Miriam Stagg
*Assistant Examiner* — Lilia Nedialkova
(74) *Attorney, Agent, or Firm* — Muncy, Geissler, Olds & Lowe, P.C.

(57) ABSTRACT

A negative electrode material applied to a lithium battery or a sodium battery is provided. The negative electrode material is composed of a first chemical element, a second chemical element and a third chemical element with an atomic ratio of x, 1−x, and 2, wherein 0<x<1, the first chemical element is selected from the group consisting of molybdenum (Mo), chromium (Cr), tungsten (W), manganese (Mn), technetium (Tc) and rhenium (Re), the second chemical element is selected from the group consisting of Mo, Cr and W, the third chemical element is selected from the group consisting of sulfur (S), selenium (Se) and tellurium (Te), and the first chemical element is different from the second chemical element.

3 Claims, 16 Drawing Sheets

(51) Int. Cl.
  *C01B 19/00*    (2006.01)
  *H01M 4/02*    (2006.01)
  *H01M 4/133*    (2010.01)
  *C01B 32/05*    (2017.01)
  *H01M 10/39*    (2006.01)
  *H01M 10/0525*    (2010.01)
  *H01M 10/054*    (2010.01)

BATTERY NEGATIVE ELECTRODE MATERIAL

BACKGROUND OF INVENTION

1. Field of the Invention

The present invention is related to negative electrode material for a battery, and more particularly is related to negative electrode material for a lithium or a sodium battery.

2. Description of the Prior Art

Among the various secondary energy storage systems, lithium battery with a high energy density is popular in our daily lives because the relevant technologies and the product status is becoming more and more mature. However, because lithium is scarce in the nature, it would be difficult to reduce the cost such that lithium battery is not yet popular for vehicle applications.

In recent years, people are looking for new materials which can be used in a battery to replace lithium. Among the various batteries, sodium battery has captured attention because it is abundant in the nature, and has less safety and environment issues. The earth contains about 20 ppm of lithium. In contrast, the earth contains about 2-3% of sodium. The price of lithium carbonate is about 5000 USD per ton. In contrast, the price of sodium carbonate is just 150 USD per ton. Thus, it is found that the materials for sodium batteries has attracted the attention after 2012.

The common negative electrode materials for a sodium battery includes graphite, soft carbon, hard carbon, metal, alloy, metallic oxide, non-metal material composition, titanate, or organic material. However, because the size of a sodium ion is 4.44 $Å^3$, which is much greater than the size of a lithium ion, i.e. 1.84 $Å^3$, thus, the mass transfer resistance for sodium ions during the charge/discharge process is much higher than that for lithium ions.

During the charge/discharge process, the electrode plate of the negative electrode may suffer severe contraction and expansion to cause a break. Thus, the cycle life for sodium battery is poor. In addition, because the reduction potential for lithium ion in compared with the standard hydrogen electrode (SHE) is -3.045V, but the reduction potential for sodium ion is only -2.714V, thus, the energy density for a sodium battery is lower than a lithium battery. Accordingly, researches of new negative electrode materials for the sodium battery has begun.

In compared with the earlier developed graphite material, the research for 2D dichalcogenides based material also has some improvements in recent years. Because of the crystalline structure characteristic, 2D dichalcogenides material is suitable to be used to construct an ion channel such that the material can be used as the electrode material (e.g. the negative electrode). Among the various 2D dichalcogenides material, $MoS_2$ is most common.

In order to better understand the characteristic of $MoS_2$ as the negative electrode material for a lithium battery, please refer to FIG. 1 and FIG. 2, wherein FIG. 1 is a diagram showing the first three charge/discharge curves of a lithium battery using $MoS_2$ as the negative electrode material; and FIG. 2 is a diagram showing the charge/discharge cycle versus coulombic efficiency of a lithium battery using $MoS_2$ as the negative electrode material.

As shown, the conventional negative electrode material for a lithium battery is composed of molybdenum (Mo) and sulfur (S) with the ratio of 1:2, and its chemical formula is $MoS_2$.

As shown in FIG. 1, the lithium battery with $MoS_2$ as negative electrode material is charged at 0.1 C (the C-rate of 0.1 C means a charge or discharge for 10 hours to completely charge or discharge the battery) and then discharged during the first charge/discharge process. In this cycle, the charge capacity is 1115 mAh/g, the discharge capacity is 791 mAh/g, and thus the coulombic efficiency is 70.9%. Then, the lithium battery is also charged at 0.1 C and then discharged during the second charge/discharge cycle. In this cycle, the charge capacity is 805 mAh/g, the discharge capacity is 763 mAh/g, and thus the coulombic efficiency is 94.8%. In FIG. 2, after 35 charge/discharge processes at 0.1 C, the lithium battery with $MoS_2$ as negative electrode material may have a charge capacity and a discharge capacity close to 700 mAh/g.

In order to better understand the characteristic of $MoS_2$ as the negative electrode material for a sodium battery, please refer to FIG. 3 and FIG. 4, wherein FIG. 3 is a diagram showing the first three charge/discharge curves of a sodium battery using $MoS_2$ as the negative electrode material; and FIG. 4 is a diagram showing the charge/discharge cycles versus coulombic efficiency of a sodium battery using $MoS_2$ as the negative electrode material.

As shown in FIG. 3, the sodium battery with $MoS_2$ as negative electrode material is charged at 0.1 C and then discharged during the first charge/discharge process (i.e. corresponding to the first charge/discharge cycle). In this cycle, the charge capacity is 578 mAh/g, the discharge capacity is 388 mAh/g, and thus the coulombic efficiency is 67.1%. Then, the sodium battery is also charged at 0.1 C and then discharged during the second cycle. In this cycle, the charge capacity is 370 mAh/g, the discharge capacity is 350 mAh/g, and thus the coulombic efficiency is 94.6%. As shown in FIG. 4, after 10 charge/discharge cycles at 0.1 C, the sodium battery with $MoS_2$ as negative electrode material may have a charge capacity and a discharge capacity close to 250 mAh/g.

In conclusion, the lithium battery with $MoS_2$ as the negative electrode material has the charge capacity and the discharge capacity close to 700 mAh/g, and the sodium battery with $MoS_2$ as the negative electrode material has the charge capacity and the discharge capacity close to 250 mAh/g. As the electricity demand increases, it is needed to improve the charge capacity and the discharge capacity of the lithium battery and the sodium battery.

In addition, because the price of Mo is about 16000 USD per ton (in July 2017), the high price may increase the cost of the user. Moreover, because atomic mass of Molybdenum is 95.95, the weight of the lithium battery and the sodium battery with $MoS_2$ as the negative electrode material would be heavy due to the heavy electrode material.

SUMMARY OF THE INVENTION

In view of the conventional technology mentioned above, it is necessary to use a great amount of Molybdenum as the negative electrode material for the lithium battery and the sodium battery with $MoS_2$ as the negative electrode material, therefore, it would be difficult to reduce the material cost and the overall weight of the lithium battery and the sodium battery.

In accordance with the aforementioned object, a negative electrode material is provided in the present invention. The negative electrode material is applied to a lithium battery or a sodium battery, and is composed of a first chemical element, a second chemical element and a third chemical element with an atomic ratio of x, 1−x, and 2, wherein 0<x<1, the first chemical element is selected from the group consisting of molybdenum (Mo), chromium (Cr), tungsten (W), manganese (Mn), technetium (Tc), and rhenium (Re), the second chemical element is selected from the group consisting of Mo, Cr, and W, the third chemical element is selected from the group consisting of sulfur (S), selenium (Se), and tellurium (Te), and the first chemical element is different from the second chemical element.

In accordance with an embodiment of the present invention, the negative electrode material of claim 1, wherein the first chemical element is selected from the group consisting of Mn and Cr.

In accordance with an embodiment of the present invention, the negative electrode material of claim 1, wherein the first chemical element is Mn, and x is 0.02.

In accordance with an embodiment of the present invention, the negative electrode material of claim 1, wherein the first chemical element is Cr, and x is 0.5.

In accordance with an embodiment of the present invention, the negative electrode material of claim 1, wherein the third chemical element is S.

As mentioned, the negative electrode material provided in the present invention, is composed of three chemical elements, wherein the first chemical element can be the group 6B element Mo, Cr, or W or the group 7B element Mn, Tc, or Re, the second chemical element can be the group 6B element Mo, Cr or W, the third chemical element can be the group 6A element Se or Te, and the first chemical element is different from the second chemical element. In addition, the first chemical element, the second chemical element, and the third chemical element have the atomic ratio of x, 1-x, and 2, wherein 0<x<1.

In compared with the conventional technology, by using the negative electrode material provided in accordance with the present invention in the lithium battery and the sodium battery, a portion of Mo is replaced by lighter chemical elements such that the overall weight of the lithium battery and the sodium battery can be reduced. In addition, because the negative electrode material provided in the present invention uses a cheaper element to replace Mo, the cost of negative electrode material for the lithium battery and the sodium battery can be also reduced.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
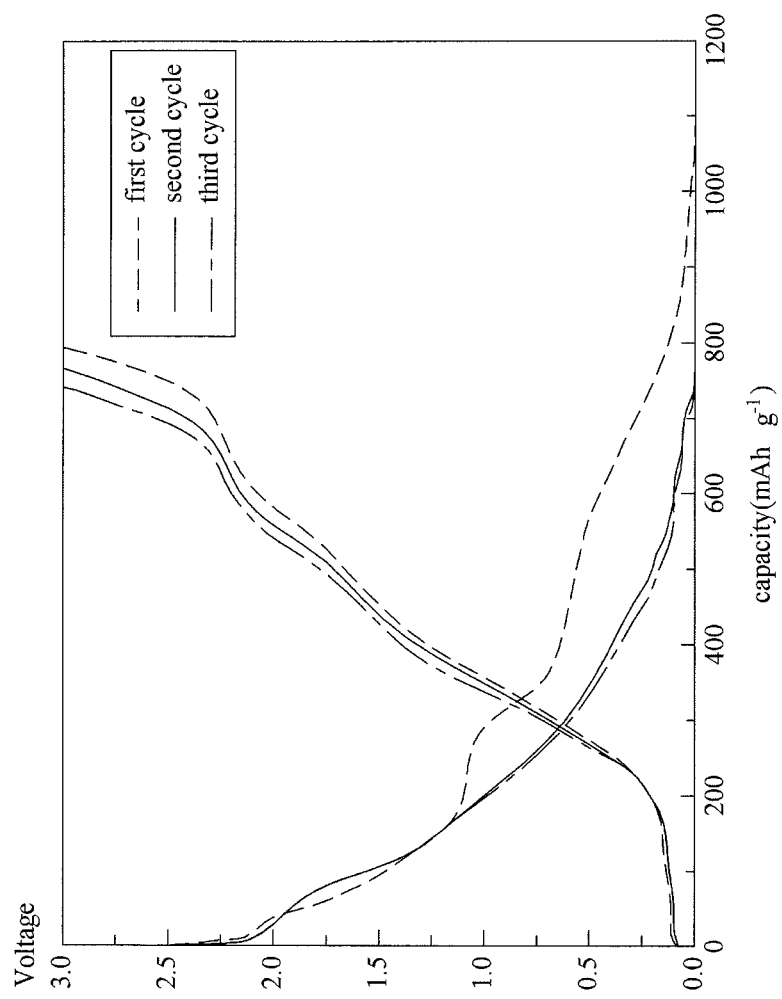
FIG. 1 is a diagram showing the first three charge/discharge curves of a lithium battery using $MoS_2$ as the negative electrode material.
Figure 2:
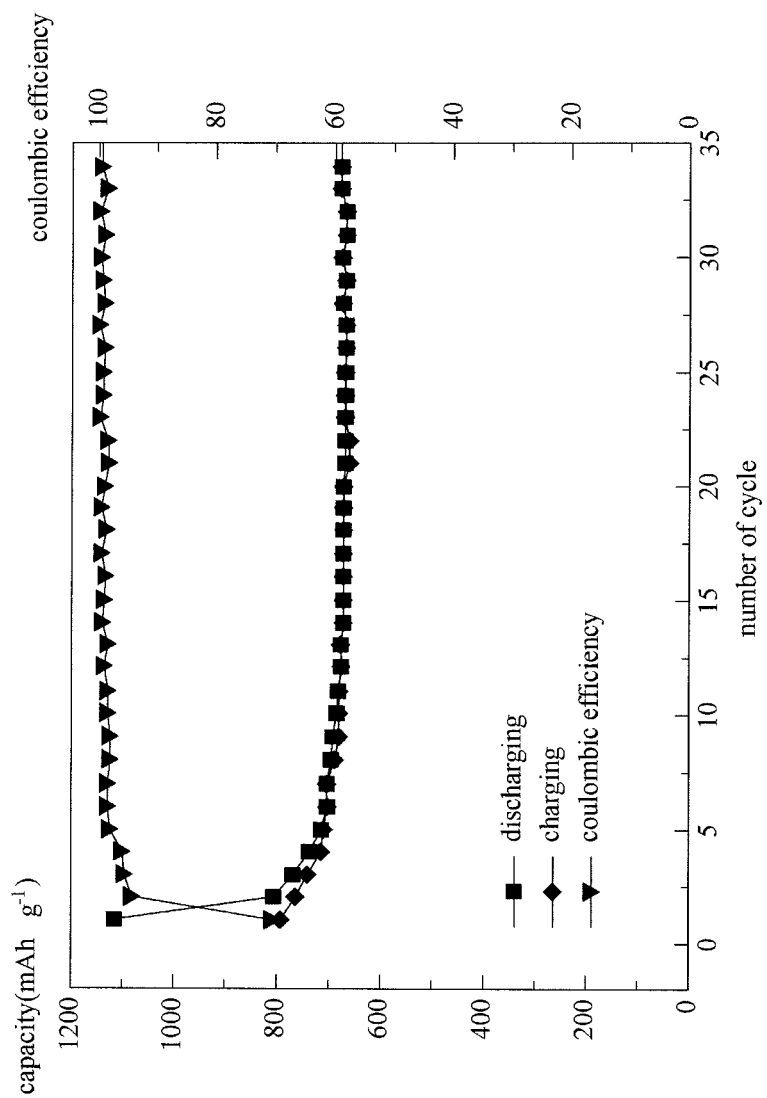
FIG. 2 is a diagram showing cycle versus coulombic efficiency of a lithium battery using $MoS_2$ as the negative electrode material.
Figure 3:
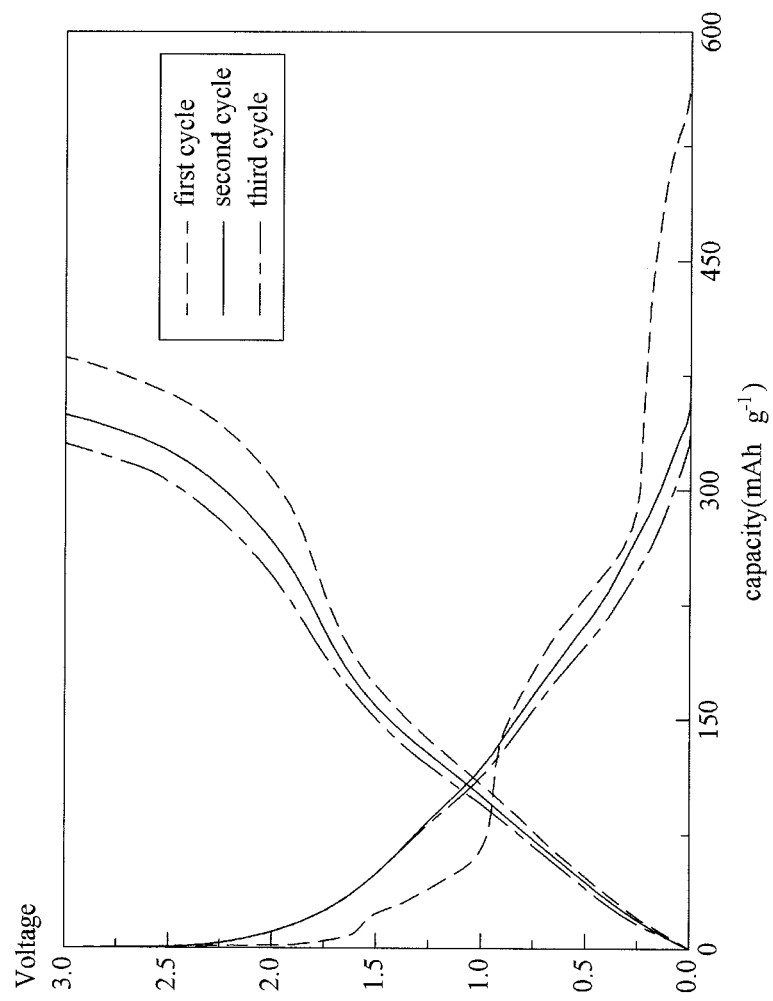
FIG. 3 is a diagram showing the first three charge/discharge curves of a sodium battery using $MoS_2$ as the negative electrode material.
Figure 4:
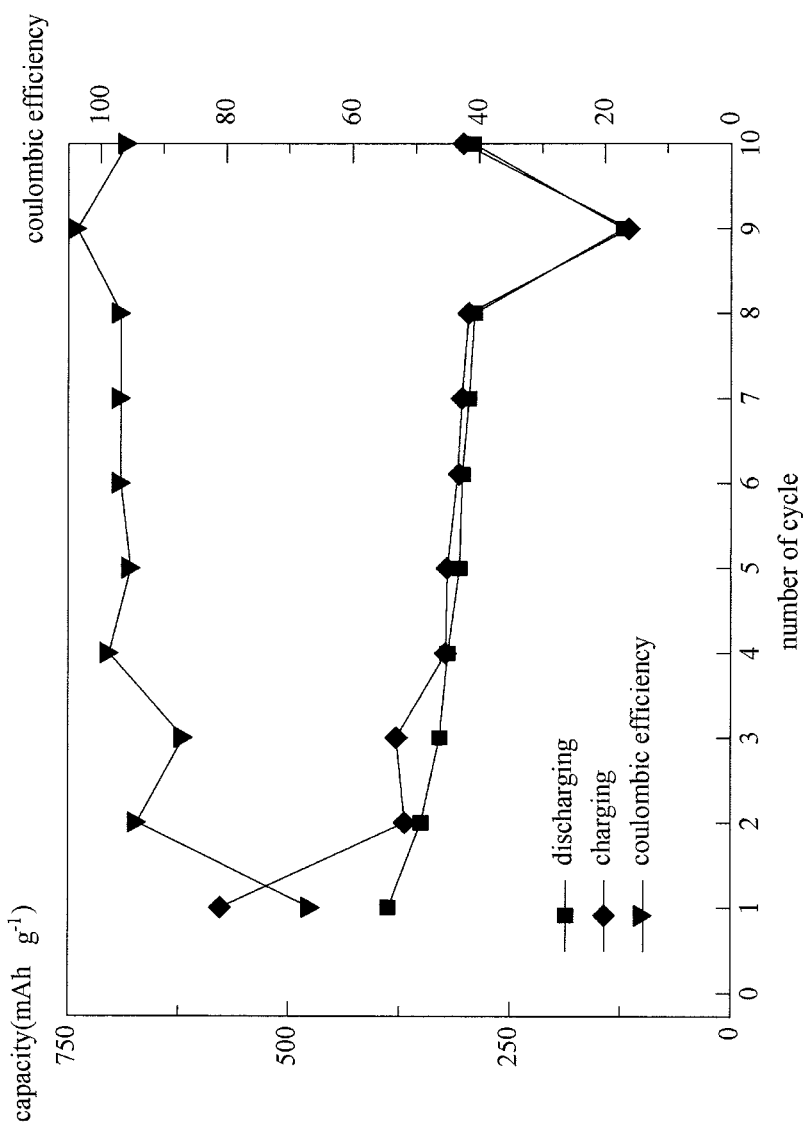
FIG. 4 is a diagram showing cycle versus coulombic efficiency of a sodium battery using $MoS_2$ as the negative electrode material.
Figure 5:
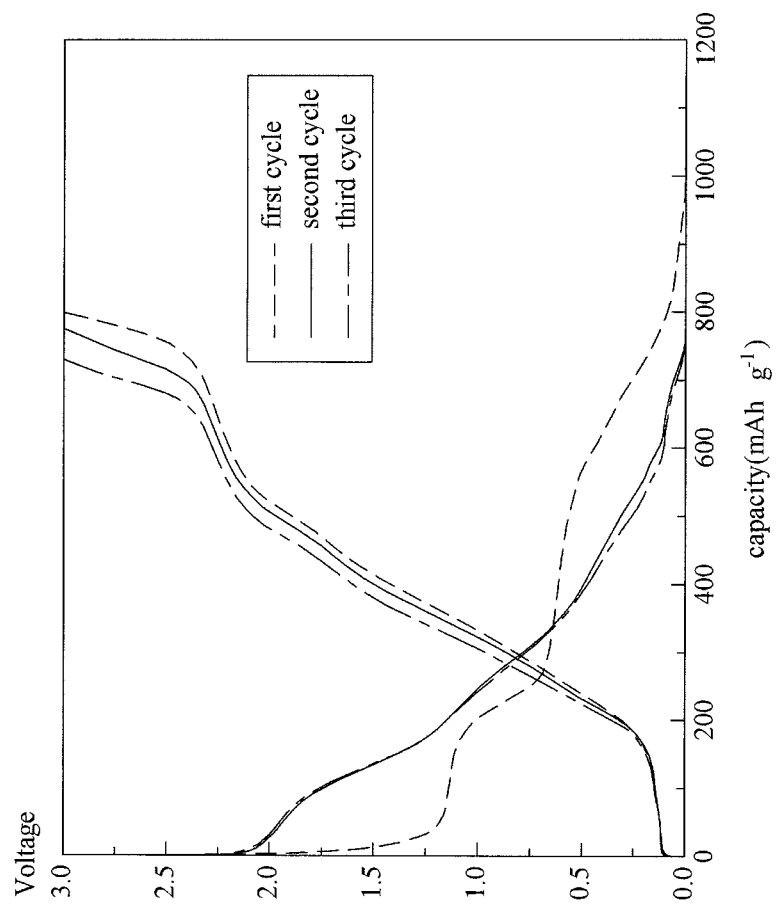
FIG. 5 is a diagram showing the first three charge/discharge curves of a lithium battery using the negative electrode material provided in accordance with a first preferred embodiment of the present invention.
Figure 6:
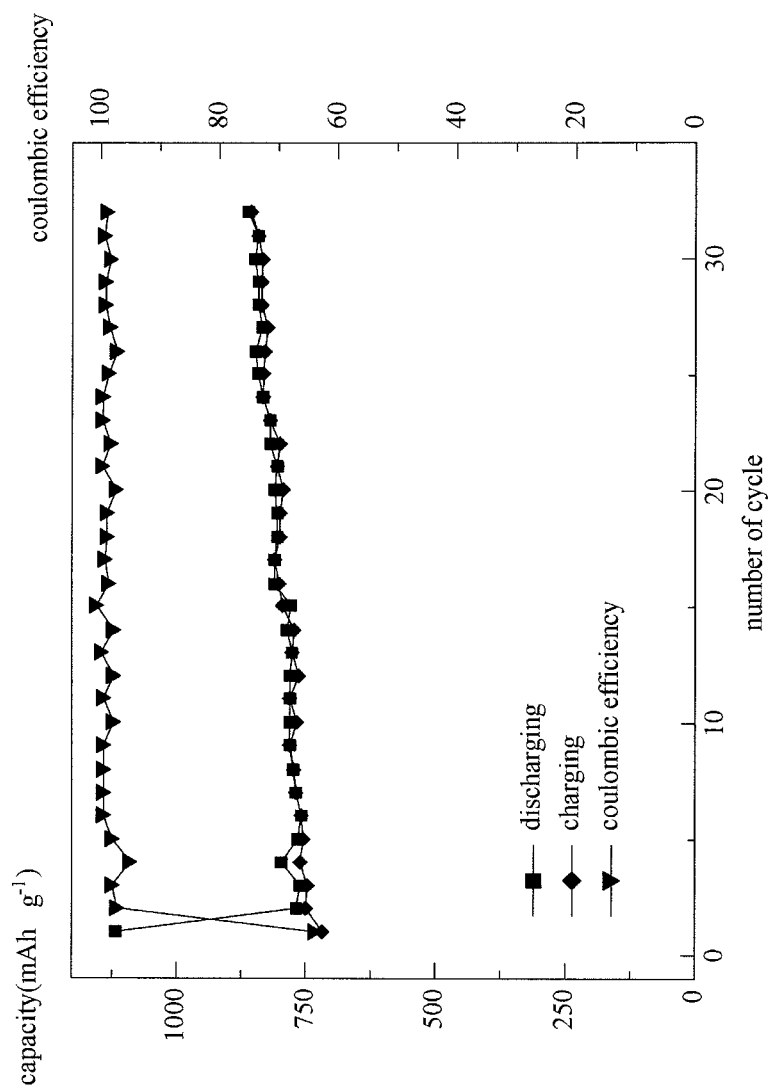
FIG. 6 is a diagram showing cycle versus coulombic efficiency of a lithium battery using the negative electrode material provided in accordance with the first preferred embodiment of the present invention.

Please refer to FIG. 5 and FIG. 6, wherein FIG. 5 is a diagram showing the first three charge/discharge curves of a lithium battery using the negative electrode material provided in accordance with a first preferred embodiment of the present invention; and FIG. 6 is a diagram showing cycle versus coulombic efficiency of a lithium battery using the negative electrode material provided in accordance with the first preferred embodiment of the present invention.

As shown, a negative electrode material is provided in accordance with a preferred embodiment of the present invention. The negative electrode material can be applied to a lithium battery or a sodium battery, and is composed of a first chemical element, a second chemical element, and a third chemical element with an atomic ratio of x, 1-x, and 2, wherein 0<x<1. The first chemical element is selected from the group consisting of molybdenum (Mo), chromium (Cr), tungsten (W), manganese (Mn), technetium (Tc), and rhenium (Re). The second chemical element is selected from the group consisting of Mo, Cr, and W. The third chemical element is selected from the group consisting of sulfur (S), selenium (Se), and tellurium (Te). The first chemical element is different from the second chemical element.

In addition, the negative electrode material provided in accordance with the present invention may be fabricated by using hydrothermal method, sol-gel method, solid state reaction method, high energy ball milling process, or co-sedimentation. In the present embodiment, the negative electrode material is fabricated by using hydrothermal method with the temperature ranged between 25° C. to 300° C. for 1 hour to 7 days. As a preferred embodiment, the hydrothermal method is proceeded at 200° C. for 3 days.

In the first preferred embodiment of the present invention, the first chemical element is Cr, the second chemical element is Mo, the third chemical element is S, and x is 0.5. The negative electrode material can be represented by the chemical formula $Cr_{0.5}Mo_{0.5}S_2$. In the other embodiments, the first chemical element can be the group 6B element Mo or W, the second chemical element can be the group 6B element Cr or W, and the third chemical element can be the group 6A element Se or Te.

As shown in FIG. 5, the lithium battery with $Cr_{0.5}Mo_{0.5}S_2$ as the negative electrode material is charged at 0.1 C and then discharged during the first charge/discharge cycle. In this cycle, the charge capacity is 1116 mAh/g, the discharge capacity is 718 mAh/g, and thus the coulombic efficiency is 64.3%. Then, the lithium battery with $Cr_{0.5}Mo_{0.5}S_2$ as negative electrode material is also charged at 0.1 C and then discharged during the second charge/discharge cycle. In this cycle, the charge capacity is 766 mAh/g, the discharge capacity is 748 mAh/g, and thus the coulombic efficiency is 97.6%. As shown in FIG. 6, after 30 charge/discharge cycles at 0.1 C, the lithium battery with $Cr_{0.5}Mo_{0.5}S_2$ as negative electrode material may have a charge capacity and a discharge capacity close to 800 mAh/g.

Figure 7:
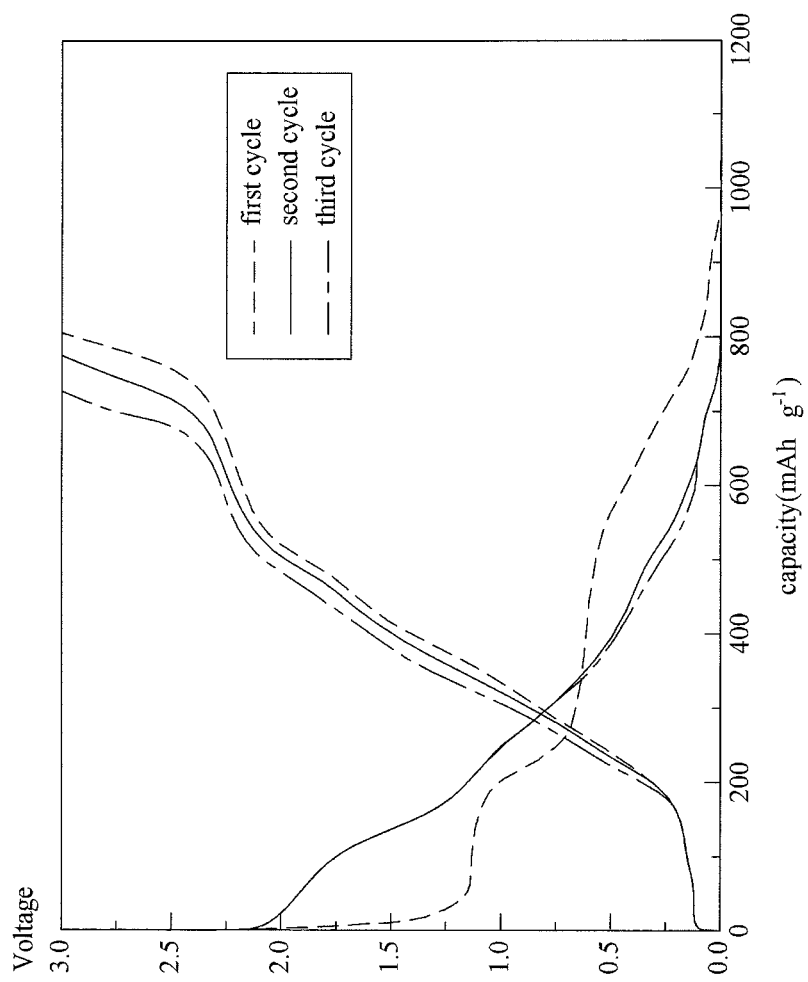
FIG. 7 is a diagram showing the first three charge/discharge curves of a lithium battery using the negative electrode material provided in accordance with a second preferred embodiment of the present invention.
Figure 8:
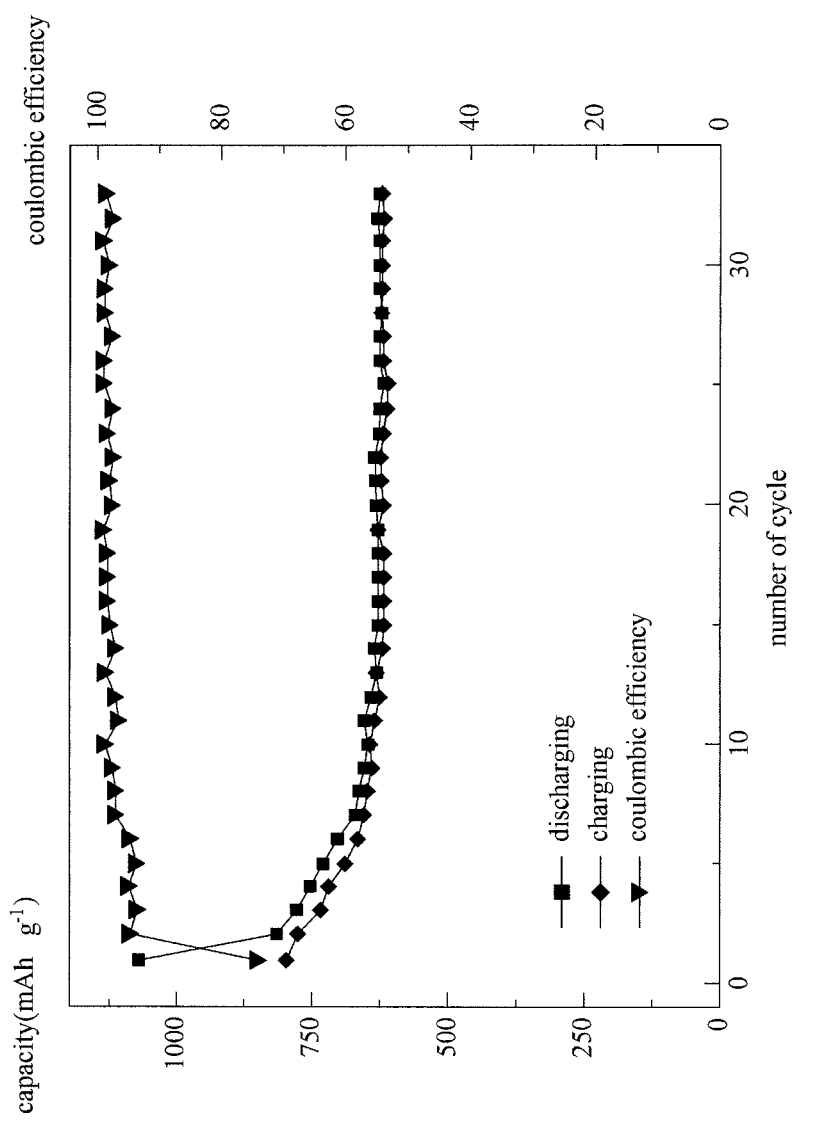
FIG. 8 is a diagram showing cycle versus coulombic efficiency of a lithium battery using the negative electrode material provided in accordance with the second preferred embodiment of the present invention.

Please refer to FIG. 7 and FIG. 8, wherein FIG. 7 is a diagram showing the first three charge/discharge curves of a lithium battery using the negative electrode material provided in accordance with a second preferred embodiment of the present invention; and FIG. 8 is a diagram showing cycle versus coulombic efficiency of a lithium battery using the negative electrode material provided in accordance with the second preferred embodiment of the present invention.

As shown, in the second preferred embodiment of the present invention, the first chemical element is Mn, the second chemical element is Mo, the third chemical element is S, and x is 0.02. The negative electrode material can be represented by the chemical formula $Mn_{0.02}Mo_{0.98}S_2$. In the other embodiments, the first chemical element can be the group 7B element Tc or Re, the second chemical element can be the group 6B element Cr or W, and the third chemical element can be the group 6A element Se or Te.

As shown in FIG. 7, the lithium battery with $Mn_{0.02}Mo_{0.98}S_2$ as negative electrode material is charged at 0.1 C and then discharged during the first charge/discharge cycle. In this cycle, the charge capacity is 1068 mAh/g, the discharge capacity is 798 mAh/g, and thus the coulombic efficiency is 74.7%. Then, the lithium battery with $Mn_{0.02}Mo_{0.98}S_2$ as negative electrode material is also charged at 0.1 C and then discharged during the second charge/discharge cycle. In this cycle, the charge capacity is 813 mAh/g, the discharge capacity is 775 mAh/g, and thus the coulombic efficiency is 95.2%. As shown in FIG. 8, after 30 cycles at 0.1 C, the lithium battery with $Mn_{0.02}Mo_{0.98}S_2$ as negative electrode material may have a charge capacity and a discharge capacity close to 600 mAh/g.

Figure 9:
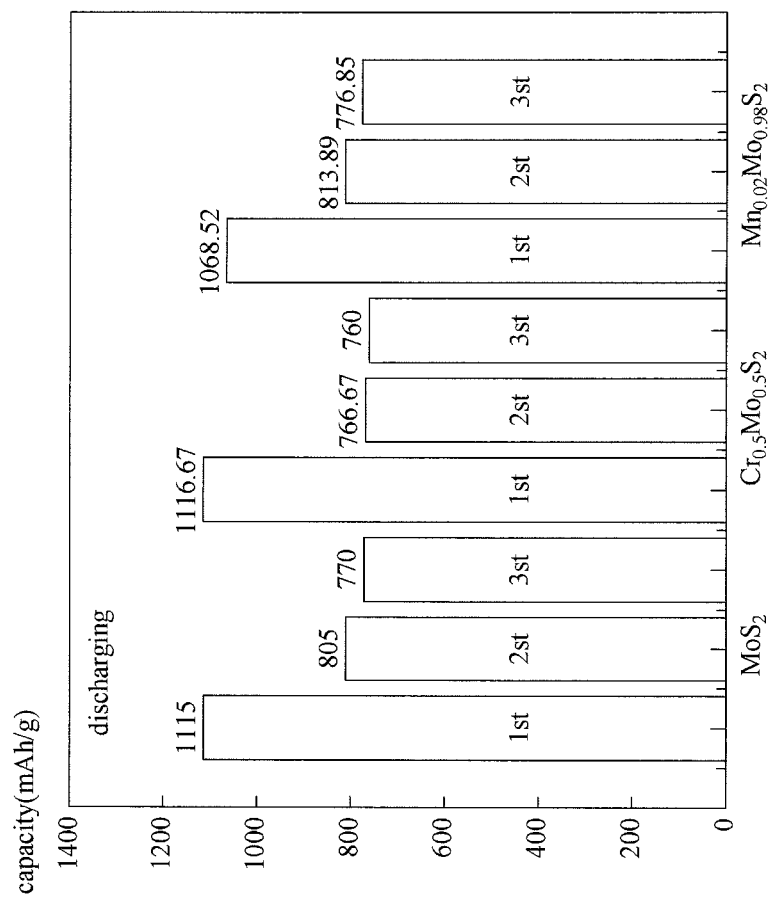
FIG. 9 is a comparison diagram showing the first three cycles of the lithium batteries using $MoS_2$, the negative electrode material in accordance with the first preferred embodiment of the present invention, and the negative electrode material the second preferred embodiment of the present invention.
Figure 10:
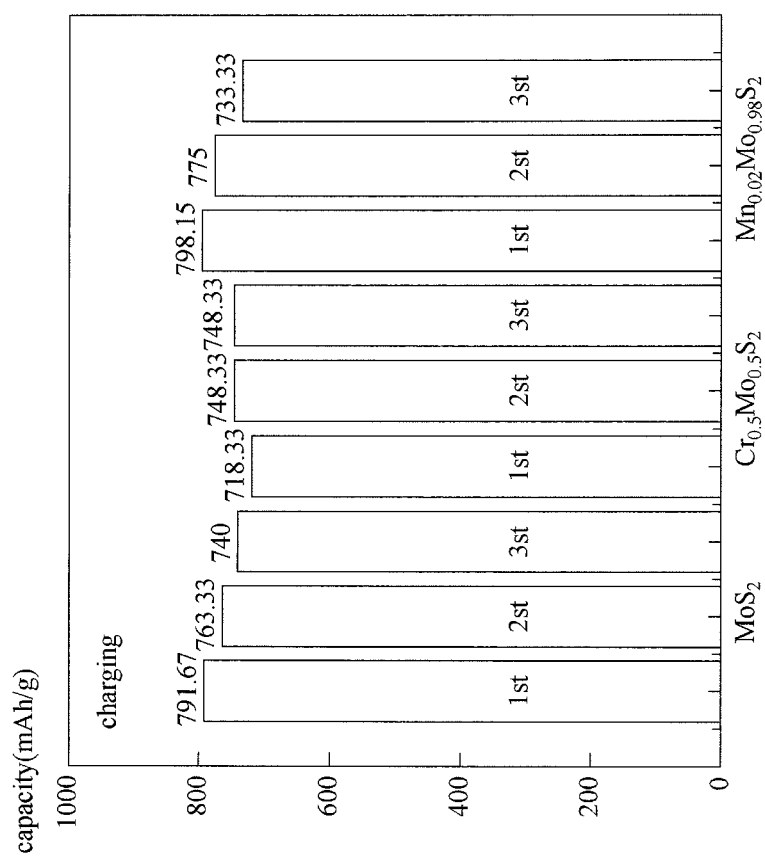
FIG. 10 is a comparison diagram showing the first three cycles of the lithium batteries using $MoS_2$, the negative electrode material in accordance with the first preferred embodiment of the present invention, and the negative electrode material the second preferred embodiment of the present invention.

Please refer to FIG. 5 to FIG. 10, wherein FIG. 9 is a comparison diagram showing the first three discharge cycles of the lithium batteries using $MoS_2$, the negative electrode material in accordance with the first preferred embodiment of the present invention, and the negative electrode material the second preferred embodiment of the present invention; and FIG. 10 is a comparison diagram showing the first three charge cycles of the lithium batteries using $MoS_2$, the negative electrode material in accordance with the first preferred embodiment of the present invention, and the negative electrode material the second preferred embodiment of the present invention.

As shown, after replacing a portion of Mo element in the conventional $MoS_2$ material by using the other 6B group elements or the 7B group elements, a substantial effect to the battery performance can be induced. It is noted that the charge/discharge capacity of the lithium battery using the negative electrode material provided in the first preferred embodiment of the present invention, i.e. $Cr_{0.5}Mo_{0.5}S_2$, is higher than the lithium battery using $MoS_2$ as the negative electrode material, therefore, cycle life of the lithium battery using $Cr_{0.5}Mo_{0.5}S_2$ as the negative electrode material is greater than the lithium battery using $MoS_2$ as the negative electrode material.

Figure 11:
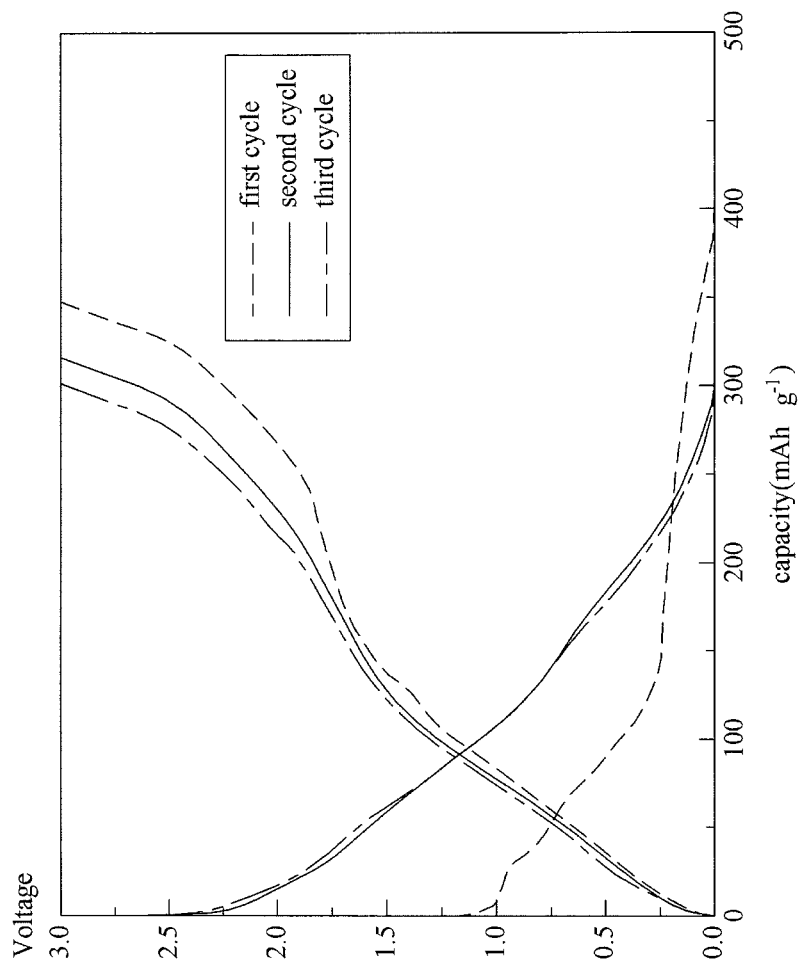
FIG. 11 is a diagram showing the first three charge/discharge curves of a sodium battery using the negative electrode material provided in accordance with the first preferred embodiment of the present invention.
Figure 12:
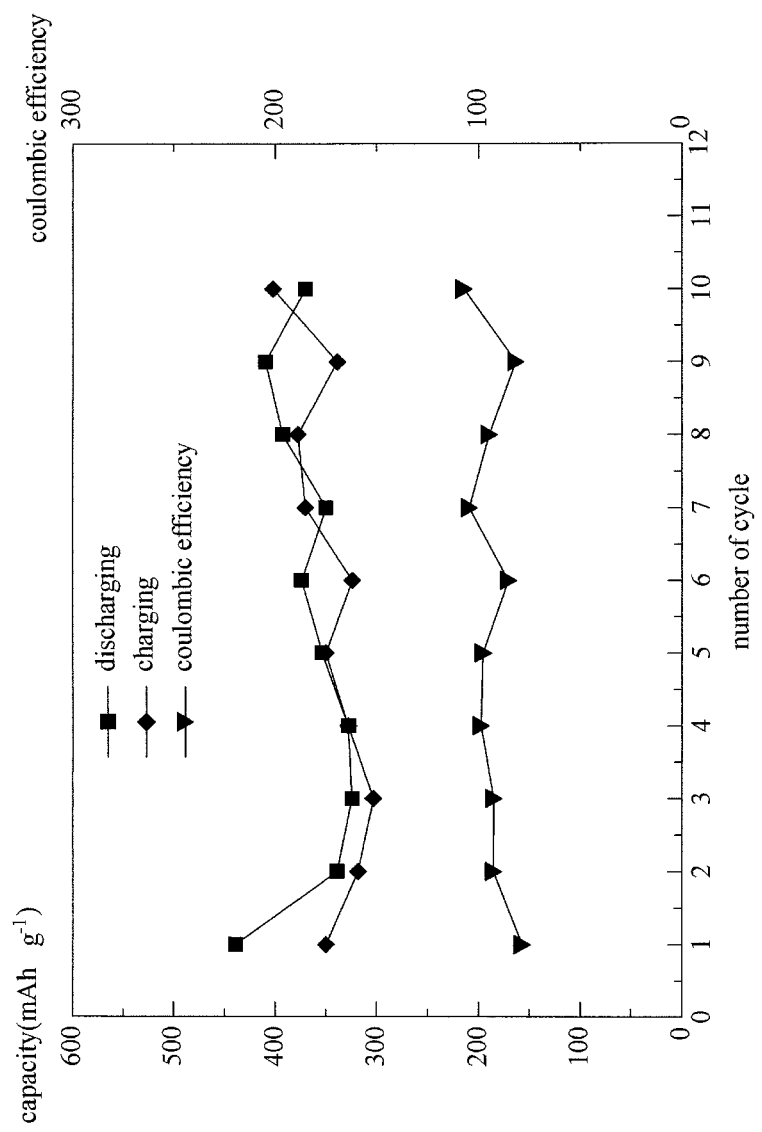
FIG. 12 is a diagram showing cycle versus coulombic efficiency of a sodium battery using the negative electrode material provided in accordance with the first preferred embodiment of the present invention.

Please refer to FIG. 11 and FIG. 12, wherein FIG. 11 is a diagram showing the first three charge/discharge curves of a sodium battery using the negative electrode material provided in accordance with the first preferred embodiment of the present invention; and FIG. 12 is a diagram showing the charge/discharge cycle versus coulombic efficiency of a sodium battery using the negative electrode material provided in accordance with the first preferred embodiment of the present invention.

As shown in FIG. 11, the sodium battery with $Cr_{0.5}Mo_{0.5}S_2$ as negative electrode material is charged at 0.1 C and then discharged during the first charge/discharge cycle. In this cycle, the charge capacity is 438 mAh/g, the discharge capacity is 350 mAh/g, and thus the coulombic efficiency is 79.8%. Then, the lithium battery with $Cr_{0.5}Mo_{0.5}S_2$ as negative electrode material is also charged at 0.1 C and then discharged during the second charge/discharge cycle. In this cycle, the charge capacity is 338 mAh/g, the discharge capacity is 318 mAh/g, and thus the coulombic efficiency is 94%. As shown in FIG. 12, after 10 charge/discharge cycles at 0.1 C, the sodium battery with $Cr_{0.5}Mo_{0.5}S_2$ as negative electrode material may have a charge capacity and a discharge capacity close to 350 mAh/g.

Figure 13:
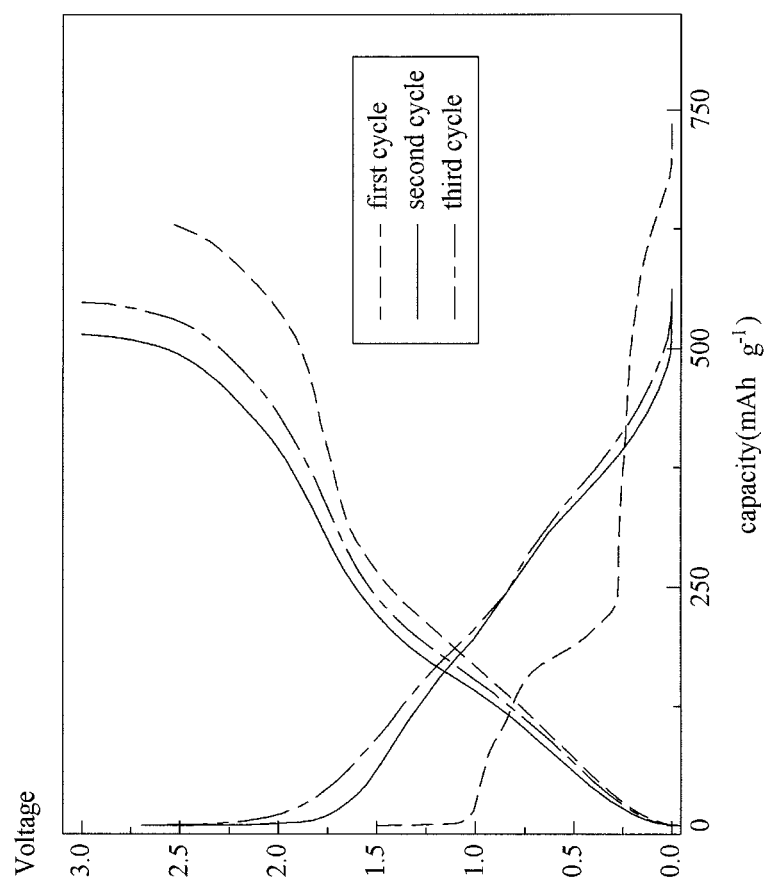
FIG. 13 is a diagram showing the first three charge/discharge curves of a sodium battery using the negative electrode material provided in accordance with the second preferred embodiment of the present invention.
Figure 14:
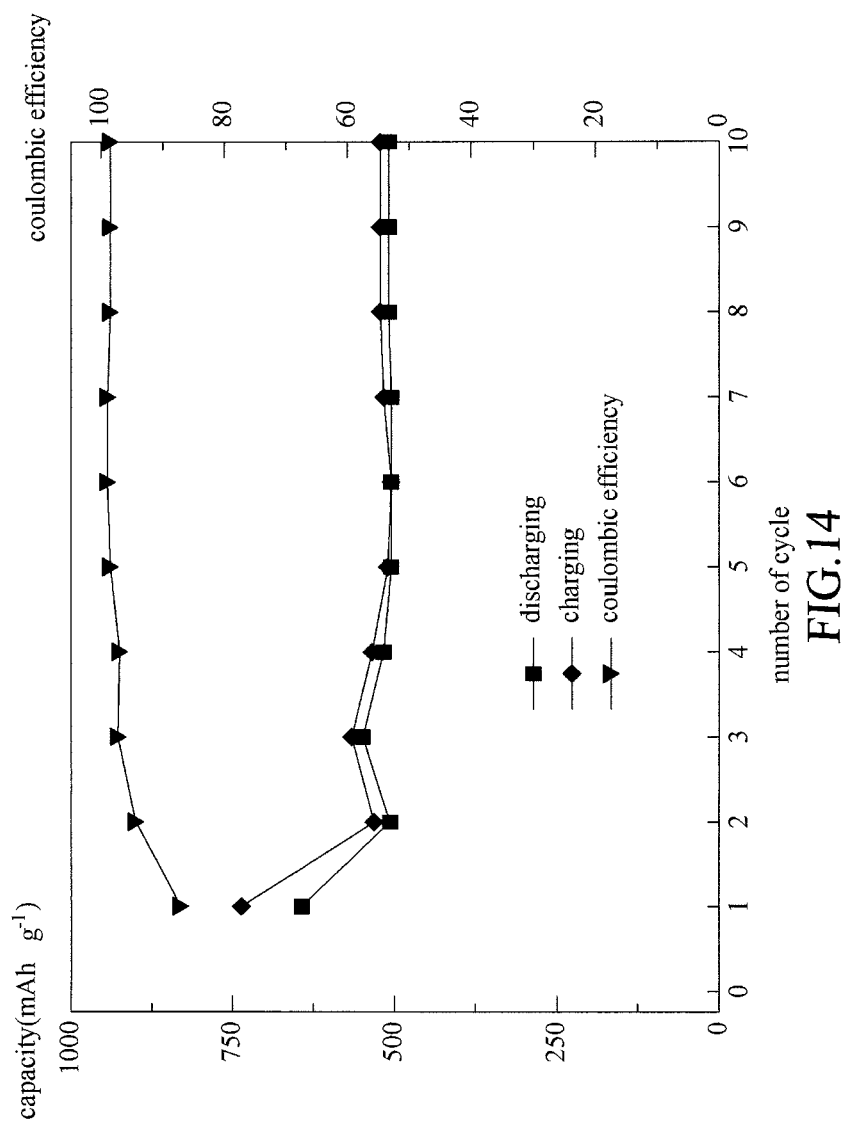
FIG. 14 is a diagram showing cycle versus coulombic efficiency of a sodium battery using the negative electrode material provided in accordance with the second preferred embodiment of the present invention.

Please refer to FIG. 13 and FIG. 14, wherein FIG. 13 is a diagram showing the first three charge/discharge curves of a sodium battery using the negative electrode material provided in accordance with the second preferred embodiment of the present invention; and FIG. 14 is a diagram showing the charge/discharge cycle versus coulombic efficiency of a sodium battery using the negative electrode material provided in accordance with the second preferred embodiment of the present invention.

As shown in FIG. 13, the sodium battery with $Mn_{0.02}Mo_{0.98}S_2$ as negative electrode material is charged at 0.1 C and then discharged during the first charge/discharge cycle. In this cycle, the charge capacity is 734 mAh/g, the discharge capacity is 644 mAh/g, and thus the coulombic efficiency is 87.81%. Then, the sodium battery with $Mn_{0.02}Mo_{0.98}S_2$ as negative electrode material is also charged at 0.1 C and then discharged during the second charge/discharge cycle. In this cycle, the charge capacity is 530 mAh/g, the discharge capacity is 503 mAh/g, and thus the coulombic efficiency is 94.9%. As shown in FIG. 14, after 10 charge/discharge cycles at 0.1 C, the sodium battery with $Cr_{0.5}Mo_{0.5}S_2$ as negative electrode material may have a charge capacity and a discharge capacity close to 500 mAh/g.

Figure 15:
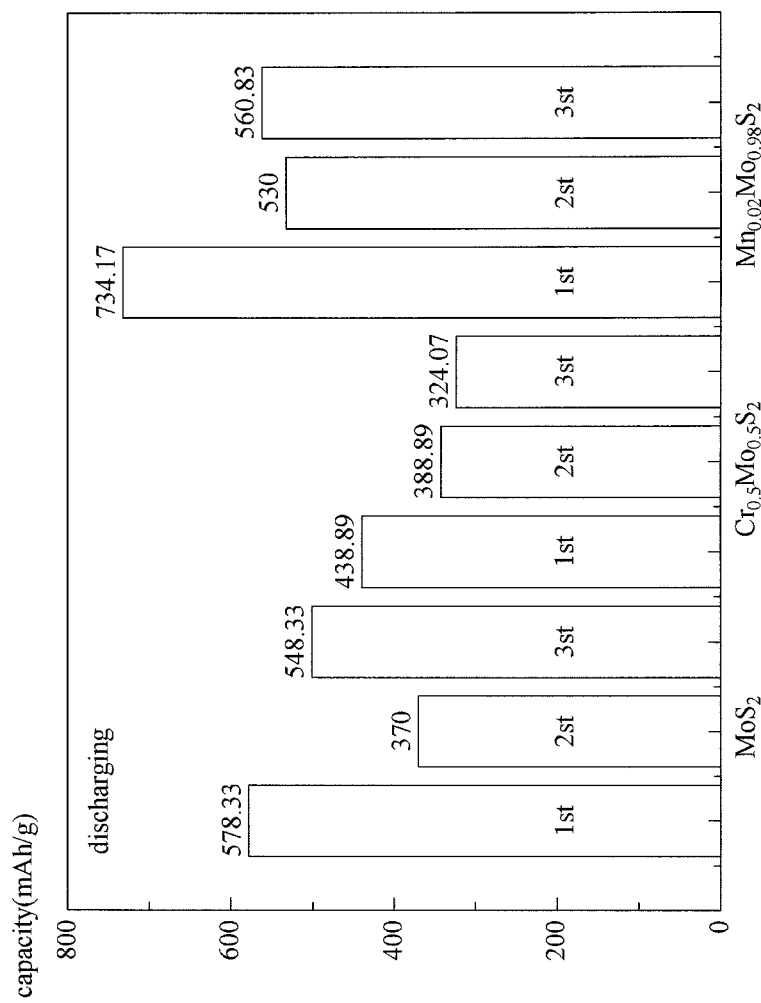
FIG. 15 is a comparison diagram showing the first three cycles of the sodium batteries using $MoS_2$, the negative electrode material in accordance with the first preferred embodiment of the present invention, and the negative electrode material the second preferred embodiment of the present invention.
Figure 16:
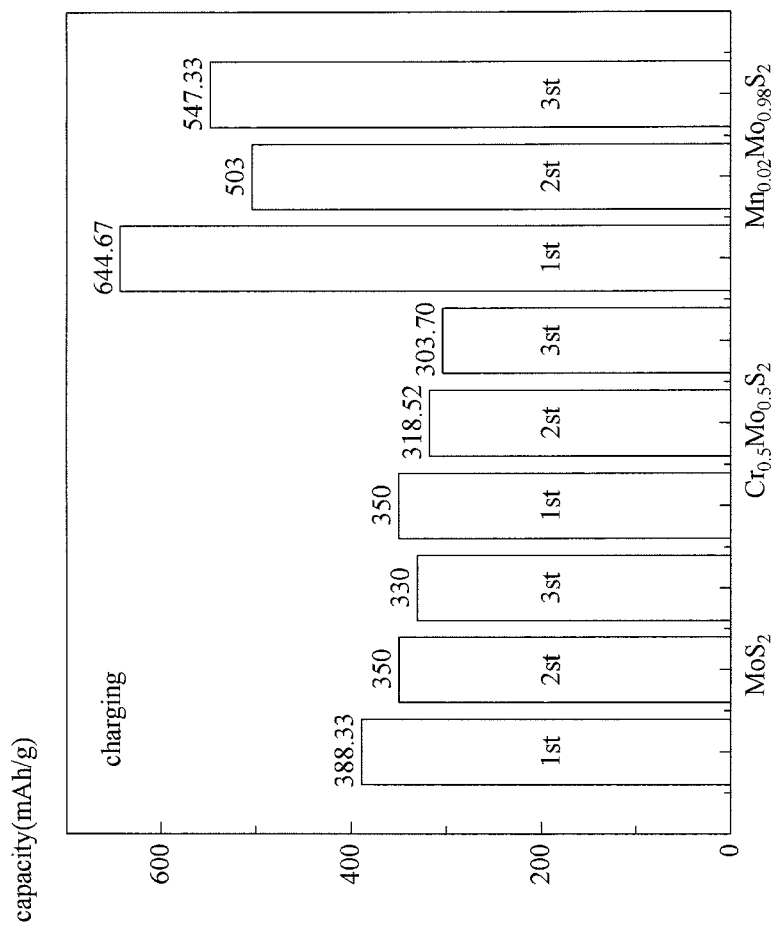
FIG. 16 is a comparison diagram showing the first three charge cycles of the sodium batteries using $MoS_2$, the negative electrode material in accordance with the first preferred embodiment of the present invention, and the negative electrode material the second preferred embodiment of the present invention.

Please refer to FIG. 11 to FIG. 16, wherein FIG. 15 is a comparison diagram showing the first three discharge cycles of the sodium batteries using $MoS_2$, the negative electrode material in accordance with the first preferred embodiment of the present invention, and the negative electrode material the second preferred embodiment of the present invention; and FIG. 16 is a comparison diagram showing the first three charge cycles of the sodium batteries using $MoS_2$, the negative electrode material in accordance with the first preferred embodiment of the present invention, and the negative electrode material the second preferred embodiment of the present invention.

As shown, after replacing a portion of Mo element in the conventional $MoS_2$ material by using the other 6B group elements or the 7B group elements, a substantial effect on the battery performance can be induced. It is noted that charge/discharge capacity of the sodium battery using the negative electrode material provided in the second preferred embodiment of the present invention, i.e. $Mn_{0.02}Mo_{0.98}S_2$, is higher than the sodium battery using $MoS_2$ as the negative electrode material.

In addition, because the price of Cr, which is about 2,900 USD per ton (in July 2017), and the price of Mn, which is about 1,900 USD per ton (in July 2017), are much lower than the price of Mo, which is about 16,000 USD per ton. Thus, material cost can be significantly reduced by using the negative electrode material provided in the present invention to replace the conventional $MoS_2$ material.

In addition, according to the experimental result, after replacing a portion of Mo element in the conventional $MoS_2$ material by using the other 6B group elements or the 7B group elements, the lithium battery and the sodium battery still possess a certain level of battery capacity and long-term stability. Moreover, the lithium battery using $Cr_{0.5}Mo_{0.5}S_2$ as the negative electrode material may have a higher cycle life, and the sodium battery using $Mn_{0.02}Mo_{0.98}S_2$ as the negative electrode material may have a higher charge/discharge capacity.

In addition, the atomic mass of Cr, i.e. 52, and the atomic mass of Mn, i.e. 54.94, are much smaller than the atomic mass of Mo, i.e. 95.94. Therefore, the negative electrode materials provided in accordance with the first embodiment and the second embodiment of the present invention are lighter than $MoS_2$ such that the overall weight of the lithium battery and the sodium battery can be reduced.

In conclusion, the negative electrode material provided in accordance with the first preferred embodiment of the present invention is composed of Cr, Mo, and S with the atomic ratio of 0.5, 0.5 and 2. The negative electrode material provided in accordance with the second preferred embodiment of the present invention is composed of Mn, Mo, and S with the atomic ratio of 0.02, 0.98, and 2. The lithium battery and the sodium battery using the negative electrode materials provided in the first preferred embodiment and the second preferred embodiment of the present invention may retain a certain level of battery capacity.

In compared with the conventional technology using $MoS_2$ as the negative electrode material, the lithium battery using the negative electrode material (e.g. $Cr_{0.5}Mo_{0.5}S_2$) provided in accordance with the first preferred embodiment of the present invention has a longer cycle life. In addition, in compared with the conventional technology using $MoS_2$ as the negative electrode material, the sodium battery using the negative electrode material (e.g. $Mn_{0.02}Mo_{0.98}S_2$) provided in accordance with the second preferred embodiment of the present invention has a greater charge/discharge capacity.

In addition, because the price of Cr and Mn are lower than the price of Mo, it would be cheaper to use the compound $Cr_{0.5}Mo_{0.5}S_2$ or $Mn_{0.02}Mo_{0.98}S_2$ as the negative electrode material in compared with $MoS_2$. In addition, because Cr and Mn are lighter than Mo, the weight of the negative electrode can also be reduced.

While the present invention has been particularly shown and described with reference to a preferred embodiment, it will be understood by those skilled in the art that various changes in form and detail may be without departing from the spirit and scope of the present invention.

What is claimed is:

1. A negative electrode material, applied to a lithium battery or a sodium battery, the negative electrode material is composed of a first chemical element, a second chemical element and a third chemical element with an atomic ratio of x, 1−x, and 2, wherein $0.5 \leq x < 1$, the first chemical element is selected from the group consisting of manganese (Mn), technetium (Tc) and rhenium (Re), the second chemical element is Cr, the third chemical element is selected from the group consisting of sulfur (S), selenium (Se) and tellurium (Te).

2. The negative electrode material of claim 1, wherein the first chemical element is Mn.

3. The negative electrode material of claim 1, wherein the third chemical element is S.

* * * * *